Reissued Feb. 7, 1933

Re. 18,729

UNITED STATES PATENT OFFICE

ALEXANDER IZSAK, OF CENTRAL PARK, NEW JERSEY, ASSIGNOR, BY MESNE ASSIGNMENTS, TO E. I. DU PONT DE NEMOURS AND COMPANY, OF WILMINGTON, DELAWARE, A CORPORATION OF DELAWARE

PROCESS FOR PRODUCING BUTYL AND ISOPROPYL ALCOHOLS

No Drawing. Original No. 1,725,083, dated August 20, 1929, Serial No. 231,991, filed November 8, 1927. Application for reissue filed July 26, 1930. Serial No. 471,077.

This invention relates to the production of butyl alcohol and isopropyl alcohol by fermentation of sugars, especially those occurring in molasses, and comprises a process of this kind in which the fermentation is brought about by a new bacterium.

An object of my invention is the successful utilization of cane molasses or beet molasses, or any fermentable hexose or pentose sugar, or other fermentable carbohydrates as a source of raw materials for the production of butyl and isopropyl alcohols. A further object of my invention is the isolation of a heretofore unisolated bacterium which I have named *Clostridium saccharobutylicum-beta.* A further object of my invention is to provide a butyl alcohol and isopropyl alcohol fermentation, wherein the bacteria to be used may be readily isolated and kept in condition for active fermentation when inoculated into a suitable mash or medium, with excellent yield of these alcohols. A still further object of my invention is the production of acetone in the same process, but in smaller quantities than the butyl and isopropyl alcohols. Other objects will appear hereinafter.

The bacteria which I prefer to use, and which possess the desirable characteristics above mentioned, have been named by me *Clostridium saccharobutylicum-beta.* The manner of isolating this species of bacteria will be hereinafter described but in order to facilitate their identification the species is described at this point in accordance with the descriptive chart of the Society of American Bacteriologists:—

Source: Barley—Malt—Meal.

Name: *Clostridium saccharobutylicum-beta.*

*I. Morpholgy*

1. Vegetative cells, motile:
   - Media used—10° Brix solution of blackstrap molasses, partly neutralized with calcium carbonate; pH-5.4; temperature, 34° C.; age, 48 hours.
   - Form: Short and long rods, chain formation.
   - Size: 6–20 microns X 2–3 microns.
   - Ends: Rounded.
   - Stain: Will not stain with methylene blue or gentian violet readily. Gram negative.
2. Sporangia:
   - Media used—10° Brix solution of blackstrap molasses, partly neutralized with calcium carbonate in excess; pH-5.4.
   - Form: Oval.
   - Spores: Terminal.
   - Limits of size: 2 to 4 microns.
   - Spores will not stain readily with methylene blue.

*II. Cultural features*

1. Nutrient agar slant media; age, 24 hours; temperature 34° C.
   - Growth: No growth on aerobic surface. Nutrient agar in deep stab; no growth along stab until depth of 1 cm. is reached. Below this point growth on puncture uniform, papillate.
2. Potato, 24 hours 34° C.
   - Growth: None (aerobic).

*III. Physical and biochemical features*

1. Fermentation tubes.

Substances fermented with gas evolution.

| | 12 hours | 40 hours | 63 hours | |
|---|---|---|---|---|
| | | | Gas | Acid |
| Raffinose | X | X | O | X |
| Sucrose | XXX | XXXX | X | X |
| Maltose | XXX | XXXX | X | X |
| Lactose | X | X | X | X |
| Dextrose | X | XX | X | XX |
| Levulose | XXX | XXXX | X | XX |
| Galactose | X | X | X | X |
| Xylose | X | X | X | X |
| Inositol | X | X | X | O |
| Starch | XX | XXX | X | X |
| Inulin | XX | XXX | X | X |
| Mannitol | X | X | X | X |
| Glycerol | X | X | O | O |
| Broth | X | X | | |

O—Absent XXX—Very strong
X—Present XXXX—Strongest
XX—Strong

The following example indicates by way of illustration a method which this new organism may be isolated:

Test tubes of ground barley malt are prepared and heated to 63° C., to saccharify the starches into maltose and are placed in an incubator at 68° C. for 24 hours. At the end of this time, the tubes are transferred to an incubator at 35° C., and left there from three to four days. *Clostridium saccharobutylicum-beta* grows under these conditions and can be readily transferred into a fermentable hexose sugar medium for further propagation. No plating is required to purify the culture, but heating to 85° C. for fifteen minutes and reincubating several times is all that is necessary.

For the production of the alcohols by means of this organism, the following examples are given for illustrative purposes:

*Example 1*

An acid mash of molasses was prepared of about 10° Brix solution of approximately 150 gallons. This acid mash of molasses may be a cane molasses which has a natural acidity, or it may be a mixture of cane and beet molasses, or it may be a beet molasses acidified. To this mash about 5 pounds of calcium carbonate was added, to neutralize or partly reduce the natural acidity of the mash, and furthermore to adjust the pH to about 5.4 to 6.8 during subsequent heating. This mash was then heated to 15 pounds pressure for about one hour, cooled off with proper care under pure culture handling. A pressure may be maintained in the fermenter by allowing $CO_2$ or other gases to flow into the tank either through the mash or over the mash during the cooling and setting stages. At 35° C. the mash was inoculated with *Clostridium saccharobutylicum-beta*, and allowed to ferment for about 72 hours, when it was found that nearly all of the sugar was exhausted or converted. The beer was then distilled by any of the known methods. I have found that under the best conditions a yield of total solvents of about 25 per cent or more may be obtained of the sugar fermented, which is composed chiefly of butyl alcohol. The ratio of products produced by this fermentation may run as high as 75 per cent butyl alcohol, 35 per cent isopropyl alcohol; some acetone, and a trace of amyl and possibly of ethyl alcohols.

*Example 2*

An acid mash of molasses was prepared of about 10° Brix solution of approximately 150 gallons, rendered neutral to litmus paper in cold solution with $Na_2CO_3$. To this mash five (5) pounds of $CaCO_3$ was added, and the mash heated to 15 pounds pressure. A sample taken while hot (100° C.), indicated 7.5 pH. This mash when allowed to cool to 35° C., showed a pH of 6.8. From this point the process was carried out similar to Example 1, and gave approximately the same results.

By the term molasses mash, as used herein, I mean to include a mixture of molasses and water. This mixture may be the ratio of from 5 to 15 parts water to one part molasses by volume. I have found that this ratio gives satisfactory results, but it will be understood, of course, that the ratio of dilution may exceed these figures.

The pH value of this mash may be adjusted to the optimum point by the use of neutralizing agents, such as the carbonates or the hydroxides of the alkali or alkaline metals, ammonia, etc., for too high acidity, or say lactic acid for too low acidity.

Although the use of sodium carbonate or calcium carbonate is to be preferred, I may use other alkaline materials, such as barium carbonate, potassium carbonate, or strontium carbonate, sodium hydroxide, or a combination of these.

According to the process disclosed herein a special, or optimum, mash condition may be maintained and controlled which results in an absolutely clean cut normal butyl alcohol fermentation free from butyric acid contamination. Furthermore, I have found that according to this invention the special preparation of the mash to insure the desired result is simple, is positive, and can be conducted on a commercial scale without the addition or installation of expensive buildings and equipment.

By the expression "maintaining and controlling the optimum conditions" as used herein I mean maintaining and controlling the acidity, temperature and concentration of the medium. By "optimum temperature" as used herein I mean to include temperatures of approximately 34 or 35° C.

As many apparently widely different embodiments of this invention may be made without departing from the spirit thereof, it is to be understood that I do not intend to limit myself to the specific embodiments thereof except as indicated in the appended claims.

I claim:

1. A process for the manufacture of butyl and isopropyl alcohols by fermentation of a fermentable carbohydrate medium wherein the medium is fermented by a bacillus obtained by saccharifying the starches of barley malt into maltose and incubating the maltose, said bacillus being identified by its having the form of short and long rods, chain formation, rounded ends, by its dimensions of 6 to 20 microns by 2 to 3 microns, and by its property of rapid formation of spores and by its ability to produce mainly butyl and isopropyl alcohols.

2. A process for the manufacture of butyl and isopropyl alcohols by fermentation of a molasses mash medium wherein the medium is fermented by a bacillus obtained by saccharifying the starches of barley malt into maltose and incubating the maltose, said bacillus being identified by its having the form of short and long rods, chain formation, rounded ends, by its dimensions of 6 to 20 microns by 2 to 3 microns, and by its property of rapid formation of spores and by its ability to produce mainly butyl and isopropyl alcohols.

3. The process of producing butyl and isopropyl alcohols and acetone, which comprises fermenting a fermentable carbohydrate medium with the herein-described *Clostridium saccharobutylicum-beta.*

4. The process of producing butyl and isopropyl alcohols and acetone which comprises fermenting a molasses mash medium with the herein-described *Clostridium saccharobutylicum-beta.*

5. The process of producing butyl and isopropyl alcohols, which comprises preparing a fermentable carbohydrate medium, and inoculating the medium with the herein-described *Clostridium saccharobutylicum-beta*, and causing the medium to ferment by the action of said bacillus.

6. The process of producing butyl and isopropyl alcohols, which comprises preparing a molasses mash medium, and inoculating the mash with the herein-described *Clostridium saccharobutylicum-beta.*

7. The process of producing butyl and isopropyl alcohols, which comprises preparing a fermentable carbohydrate medium, partially neutralizing the acidity or alkalinity of the medium, sterilizing the medium, and inoculating the medium with the herein-described *Clostridium saccharobutylicum-beta.*

8. The process of producing butyl and isopropyl alcohols which comprises fermenting a fermentable carbohydrate medium with a bacillus identified by its having the form of short and long rods, rounded ends, chain formation, by its dimensions of 6 to 20 microns by 2 to 3 microns, by its property of rapid formation of spores and by it ability to produce mainly butyl and isopropyl alcohols in the presence of a material capable of maintaining in the sugar medium an optimum pH value of between 5.4 and 7.

9. The process of producing butyl and isopropyl alcohols which comprises fermenting a molasses mash medium with a bacillus identified by its having the form of short and long rods, rounded ends, chain formation, by its dimensions of 6 to 20 microns by 2 to 3 microns, by its property of rapid formation of spores and by its ability to produce mainly butyl and isopropyl alcohols in the presence of a material capable of maintaining in the sugar medium an optimum pH value of between 5.4 and 7.

10. In the process of producing butyl and isopropyl alcohols the steps which comprise preparing a fermentable carbohydrate medium, partially neutralizing the acidity or alkalinity of the medium, sterilizing the medium, cooling the medium to approximately 35° C. and inoculating the medium with the herein-described *Clostridium saccharobutylicum-beta*, allowing the fermentation to proceed to completion and distilling off said alcohols.

11. The process of producing butyl and isopropyl alcohols, which comprises preparing a fermentable carbohydrate medium, adding a neutralizing agent to the medium, sterilizing the medium, and inoculating the medium with the herein-described *Clostridium saccharobutylicum-beta*, and causing the medium to ferment by the action of said bacillus.

12. The process of producing butyl and isopropoyl alcohols which comprises preparing a fermentable carbohydrate medium, adding a neutralizing agent to the medium, sterilizing the medium, cooling the medium to approximately 35° C. and inoculating the medium with the herein-described *Clostridium saccharobutylicum-beta*, and causing the medium to ferment by the action of said bacillus.

13. The process of producing butyl and isopropyl alcohols which comprises preparing a fermentable carbohydrate medium, adding a neutralizing agent to the medium, sterilizing the medium, cooling the medium to approximately 35° C., maintaining the medium in a sterilized condition in the presence of an oxygen-free gas which is inert with respect to the medium, inoculating the medium with the herein-described *Clostridium saccharobutylicum-beta* and causing the mixture to ferment by the action of said bacillus.

14. The process of producing butyl and isopropyl alcohols, which comprises fermenting a fermentable carbohydrate medium in the presence of a neutralizing and buffering material capable of maintaining an optimum pH value in the medium of 5 to 7.0, and inoculating the medium with the herein-described *Clostridium saccharobutylicum-beta.*

15. The process of producing butyl and isopropyl alcohols which comprises preparing a fermentable carbohydrate medium, adding a neutralizing material to the medium to partilly neutralize the natural acidity or alkalinity of the medium and to adjust the pH to about 5.4 to 7.0, sterilizing the medium, cooling the medium to approximately 35° C., maintaining the medium substantially free from free oxygen, and inoculating the medium with herein-described *Clostridium saccharobutylicum-beta*, and causing the mixture to ferment by the action of said bacillus.

16. The process of producing butyl and isopropyl alcohols which comprises preparing a fermentable carbohydrate medium, adding a neutralizing material to the medium to partially neutralize the natural acidity or alkalinity of the medium and to adjust the pH to about 5.4 to 7.0, sterilizing the medium, cooling the medium to approximately 35° C., maintaining the medium in a sterilized condition in the presence of an oxygen-free gas which is inert with respect to the medium, inoculating the medium with the herein-described *Clostridium saccharobutylicum-beta*, and causing the medium to ferment by the action of said bacillus.

17. The process of producing butyl and isopropyl alcohols which comprises preparing an acid molasses medium, adding an alkaline substance taken from a group including calcium carbonate, sodium carbonate, sodium hydroxide and ammonium hydroxide to the medium, sterilizing the medium, cooling the medium to approximately 35° C., inoculating the medium with the herein-described *Clostridium saccharobutylicum-beta*, and causing the medium to ferment by the action of said bacillus.

18. The process of producing butyl and isopropyl alcohols, which comprises preparing an acid medium of a carbohydrate material and water, containing also an alkaline material capable of maintaining the herein-described optimum pH condition in the medium of 5.4 to 7.0, sterilizing the medium, inoculating the medium with the herein-described *Clostridium saccharobutylicum-beta*, causing the medium to ferment by the action of said bacillus, and distilling off the said alcohols.

ALEXANDER IZSAK.